Dec. 26, 1950  S. OESTREICHER  2,535,154
VARIABLE OUTPUT TRANSFORMER
Filed July 8, 1947
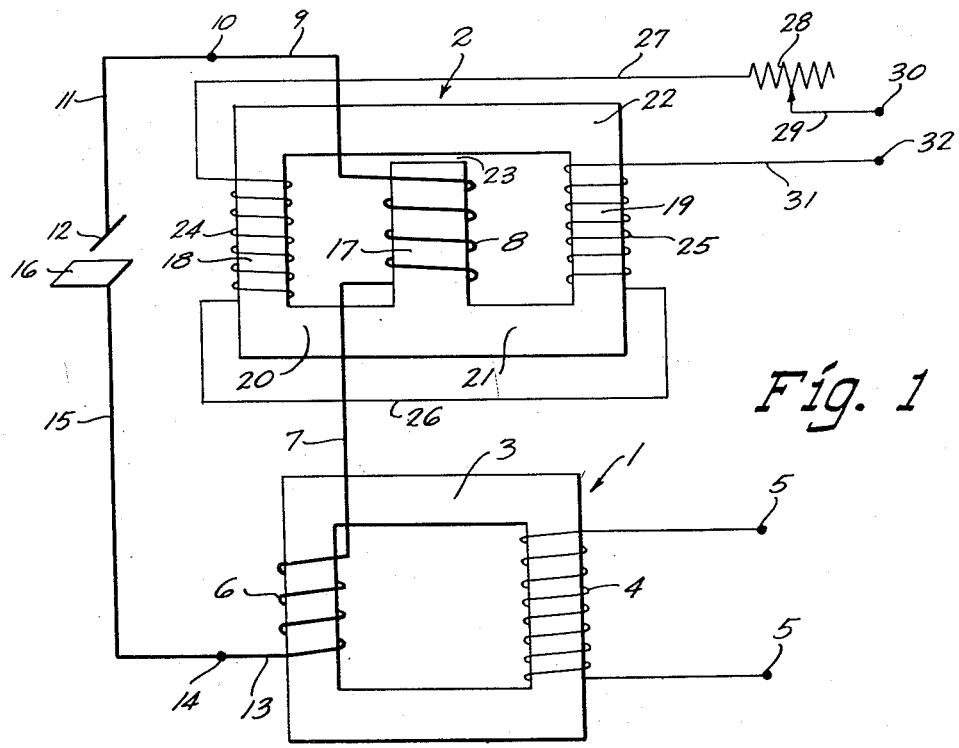
Fig. 1
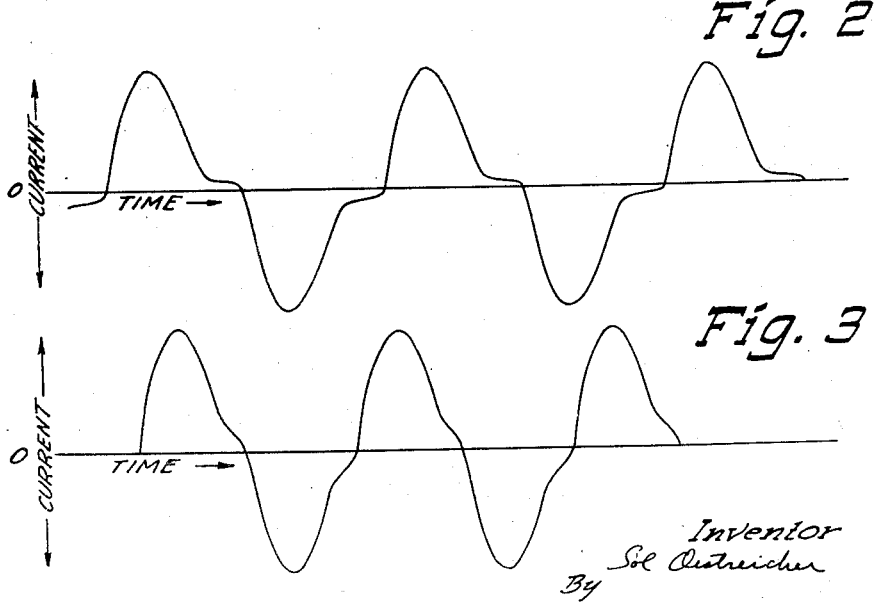
Fig. 2
Fig. 3
Inventor
Sol Oestreicher
By
David A. Fox
Attorney Patented Dec. 26, 1950

2,535,154

UNITED STATES PATENT OFFICE 2,535,154

VARIABLE OUTPUT TRANSFORMER

Sol Oestreicher, Milwaukee, Wis., assignor to Harnischfeger Corporation, Milwaukee, Wis., a corporation of Wisconsin Application July 8, 1947, Serial No. 759,553

4 Claims. (Cl. 323—60)

This invention relates to apparatus for supplying arc welding alternating current and it resides more specifically in an apparatus comprising a transformer with an output circuit interlinking a magnetic path having a predetermined air gap. The magnetic path is provided with separate excitation windings adapted to modify the degree of saturation thereof whereby the current flowing in the output circuit is subject to control through control of the degree of saturation of said magnetic path. The apparatus as a whole, by reason of the air gap above referred to, provides a supply of arc welding current in which the current wave form is free of undesirably long intervals of low current.

For the purpose of supplying arc welding alternating current certain advantages from the standpoint of compactness and ease of adjustment are possessed by a type of apparatus in which control of output is brought about by regulation of the degree of saturation of a magnetic path interlinking the output circuit of an otherwise non-adjustable transformer. In such apparatus, in the forms heretofore known, the current wave produced in the output circuit is distorted in such manner as to give rise to undesirably long intervals of low current.

It is an object of this invention to provide an arc welding alternating current source of this type in which the current wave form passes rapidly through the zero current axis without any substantial dwell at or near zero current, whereby the arc produced is rendered more stable.

Other objects and advantages of the apparatus of this invention will be apparent from the description which follows:

This invention is herein described by reference to the accompanying drawings forming a part hereof in which there is set forth by way of illustration and not of limitation specific forms in which the apparatus of this invention may be embodied.

In the drawings:

Fig. 1 is a diagrammatic showing of one form of the circuit of this invention employing a separate saturation reactor having an air gap;

Fig. 2 is a diagrammatic showing in the form of a graph of a current wave form having undesirably protracted intervals of low current the same being set forth for purposes of comparison with the current wave form produced by the apparatus of this invention;

Fig. 3 is a diagrammatic showing in the form of a graph of the current wave form produced by the apparatus of this invention showing rapid passage of the current through the zero axis without substantial dwell at low current values.

Referring now to the drawings and particularly to Fig. 1 the form of the apparatus there shown is made up of two principal units, namely, a transformer designated generally by the numeral 1 and a saturation reactor designated generally by the numeral 2. The transformer 1 is provided with a closed magnetic frame 3 upon which there is mounted in conventional fashion a primary winding 4 having terminals 5—5 adapted to be connected to a source of supply of alternating current. The transformer 1 is also provided with a secondary winding 6 adapted to furnish current in an amount and at a potential somewhat in excess of that appropriate for arc welding purposes.

The secondary winding 6 of the transformer 1 is connected by a lead 7 with a winding 8 surrounding the central leg 17 of the magnetic frame of saturation reactor 2. The other end of the winding 8 is connected through a lead 9 to a terminal 10 intended to be connected by a cable 11 with an arc welding electrode 12 as shown. The end of the secondary winding 6 opposite the lead 7 is connected by a lead 13 with a terminal 14 adapted to be connected through a ground lead connection 15 to a work piece 16 upon which welding is to be carried on.

The magnetic frame of the reactor 2 is made up of a central leg 17 previously referred to, side legs 18 and 19, return portions 20 and 21 and an upper return portion 22 the latter being spaced from the end of central leg 17 so as to leave an air gap 23 as shown. Surrounding the outer legs 18 and 19 are excitation windings 24 and 25 which are joined to one another by lead 26 as shown. The free end of winding 24 is connected by lead 27 to a rheostat 28 and thence through lead 29 to a terminal 30 adapted to be connected to one side of a source of a direct current. The free end of winding 25 is connected by means of lead 31 with terminal 32 adapted to be connected to the other side of the source of direct current. By reason of this arrangement adjustment of rheostat 28 will cause magnetization of the frame of reactor 2 to any degree desired up to and including a condition of substantial saturation. Windings 24 and 25 are wound in such direction as to offset between them induced alternating potential resulting from current flowing in the winding 8.

In use, the apparatus above described is supplied with alternating current through the terminals 5—5 and the terminals 10 and 14 are connected as shown to an arc welding electrode and a work piece. Rheostat 28 is adjusted as desired to produce a predetermined condition of magnetization in the frame of the reactor 2 so as to admit an appropriate quantity of current to the welding electrode. Under such circumstances and with the apparatus as above described the current supplied to the welding electrode will have a wave form more or less typified by the graph appearing in Fig. 3 where it will be noted the current crosses the zero axis with a steeply inclined slope. By reason of this shape of wave form the interval of time during which current remains at or near zero is brief, a condition assisting the maintenance of a stable arc. It has been found that in the apparatus as heretofore employed differing from that above described by reason of absence of air gap 23 the welding current wave form will be as typified in Fig. 2, where it will be noted that a substantial dwell of the current at or near zero occurs each time the current crosses the zero axis. Such a dwell in the current at or near zero very materially detracts from the stability of a welding arc.

The advantages of compactness and ease of adjustment of output of an apparatus employing a non-adjustable transformer in conjunction with a saturation reactor are thus made available in a form in which the current exhibits characteristics favorable to maintenance of a stable arc. It has been found that the air gap 23 will produce desirable results even though it is of comparatively small extent and a comparatively small air gap is preferred since the extent of windings and quantity of magnetic material required to obtain the degree of regulation necessary for arc welding purposes is thereby minimized. However, where economy in materials and space is not of consequence the air gap 23 may be of considerable extent. It will be found in the usual case of practical design that an air gap of from .02 of an inch to .09 of an inch will be found useful. For preferred results it has been found that a gap of from .04 to .06 of an inch may be employed.

In apparatus of this invention a transformer is employed in which the output circuit or some part of the same interlinks a magnetic path which is closed except for a predetermined air gap and this magnetic path is adapted to be independently magnetized at least in part through excitation windings. It is the discovery of this invention that where such an independently magnetizable path interlinking the output circuit is not closed but interrupted by an air gap or air gaps of small extent a current wave form favorable to maintenance of a stable arc results. While the improved stability of the arc produced by the apparatus of this invention obviously results in no small measure from the favorable current wave form, it has been found that the improvement in stability of the arc experienced, exceeds that which would be expected to result simply from improvement of current wave form, and arcs of a stability heretofore obtainable only with elaborate and expensive arc assisting circuit auxiliaries are obtainable with the apparatus of this invention alone.

I claim:

1. In an apparatus adapted to furnish a regulated supply of arc welding alternating current a transformer having a primary winding adapted to be connected to a source of alternating current and an output circuit including a secondary winding adapted to furnish alternating current suitable for welding; means adapted to regulate the reactance of the output circuit of said transformer, said means including a three legged reactor frame having side legs and a central leg interrupted by an air gap, a reactance winding connected in said output circuit surrounding said central leg, direct current magnetizing control windings surrounding said side legs, and a controllable source of direct current for exciting said windings.

2. In an apparatus adapted to furnish a regulated supply of arc welding alternating current the combination comprising a transformer having a primary winding adapted to be connected to a source of alternating current and a secondary winding; a saturable reactor having a magnetic frame provided with a central leg and side legs to form a magnetic circuit, an air gap in said central leg interrupting said magnetic circuit, a reactance winding surrounding said central leg connected in series with the secondary of said transformer to form a welding output circuit, direct current magnetizing control windings surrounding said side legs; and a controllable source of direct current for exciting said magnetizing control windings.

3. An apparatus in accordance with claim 2 wherein the controllable source of direct current is an independent source of direct current including means for controllably altering the same independently of current conditions prevailing in said output circuit.

4. An apparatus in accordance with claim 1 wherein the windings surrounding the side legs are wound and connected to offset between them induced alternating potential therein resulting from a current flowing in said reactance winding.

SOL OESTREICHER.

REFERENCES CITED

The following references are of record in the file of this patent:

UNITED STATES PATENTS

| Number | Name | Date |
| --- | --- | --- |
| 1,376,978 | Stoekle | May 3, 1921 |
| 1,668,711 | Evans | May 8, 1928 |
| 1,824,577 | Sorensen | Sept. 22, 1931 |
| 2,062,037 | Overbeck | Nov. 24, 1936 |
| 2,200,632 | Mills | May 14, 1940 |
| 2,302,893 | Roberts | Nov. 24, 1942 |
| 2,346,997 | Priest | Apr. 18, 1944 |